United States Patent [19]

Katamoto et al.

[11] Patent Number: 5,270,356
[45] Date of Patent: Dec. 14, 1993

[54] WATER BASED COATING COMPOSITION

[75] Inventors: Katunori Katamoto; Masanori Ueno; Mituo Umezawa, all of Tokyo, Japan

[73] Assignee: Toyo Ink Manufacturing Co., Ltd., Tokyo, Japan

[21] Appl. No.: 911,932

[22] Filed: Jul. 10, 1992

[30] Foreign Application Priority Data

Jul. 11, 1991 [JP] Japan .................................. 3-197147

[51] Int. Cl.⁵ ........................... C08K 3/20; C08L 33/08
[52] U.S. Cl. ..................................... 523/409; 523/412
[58] Field of Search ................................ 523/409, 412

[56] References Cited

U.S. PATENT DOCUMENTS 4,302,373 11/1981 Steinmetz ............................ 523/409

FOREIGN PATENT DOCUMENTS 1298849 2/1962 France .
2083044 3/1982 United Kingdom .

*Primary Examiner*—Melvyn I. Marquis
*Assistant Examiner*—D. Aylward
*Attorney, Agent, or Firm*—Wenderoth, Lind & Ponack

[57] ABSTRACT

A water based coating composition which gives a coating being capable of withstanding heat treatment of food for sterilization, particularly, retorting treatment, having sufficiently high hardness against scratching in transferring and transportation, having processability sufficient to withstand the formation of cans having a variety of forms, and having little organic solvent content. The above water based coating composition contains, as resin components, 20 to 80 parts by weight of a water based acrylic resin, 20 to 50 parts by weight of a water based amino resin and 5 to 30 parts by weight of an amine-modified epoxy resin.

5 Claims, No Drawings

WATER BASED COATING COMPOSITION

FIELD OF THE INVENTION

The present invention relates to a water based coating composition, particularly to a water based coating composition which is excellent in resistance to retorting treatment, processability and coatability, which is also excellent in dispersibility for a pigment, and which can permit the decreasing of a solvent.

PRIOR ART OF THE INVENTION

The outer surface of a can containing a soft drink, food, etc., is coated with a coating composition which prevents the corrosion of the can material, improves the aesthetical product value and is capable of withstanding the heat treatment of the food, etc., for sterilization. The coating on a can is conventionally formed by applying a solution of an epoxy/amino resin, an acryl/amino resin or a polyester/amino resin in an organic solvent to a can material with a roll coater, and curing the resultant coating by baking it in a gas oven. However, these coating compositions dissipate a large amount of a solvent when baked, and cause air pollution. These coating compositions are also undesirable in view of resource saving. It has been therefore desired to develop a water based coating composition which can overcome these problems.

Conventional water based coating compositions are largely classified into water-dispersible and water-soluble coating compositions. Most of the water-dispersible resins are generally synthesized by an emulsion polymerization method using a surfactant. The surfactant remains in a formed coating and decreases the water resistance of the coating. Meanwhile, there is also a method in which a resin containing an acid content (carboxyl group) is synthesized in the presence of an organic solvent without using a surfactant and neutralized with a volatile base to form a water-dispersible or water-soluble resin. In a water based coating composition containing such a resin, the basic resin structure is required to have an acid content having an acid value of at least 20. Therefore, this water based coating composition is inferior in performances such as water resistance and alkali resistance. To overcome these defects, there has been conventionally employed a method in which a large amount of a water based amino resin such as hexamethoxymethylmelamine or methylated benzoguanamine is incorporated into an acrylic resin. However, the so-obtained coating composition shows a great decrease in processability. Further, when the proportion of the water based amino resin is decreased to improve the processability, the hardness of the coating tends to decrease. It has been therefore difficult to achieve a good-balance among water resistance, coating hardness and processability.

There is another method in which a phosphoric acid- or carboxylic acid-modified epoxy resin is incorporated into an acrylic resin. Since, however, a phosphoric acid- or carboxylic acid-modified epoxy resin has poor compatibility with an acrylic resin, the resultant coating composition is poor in shelf life and leveling. This tendency clearly appears particularly when a pigment is dispersed.

Further, conventional water-soluble coating compositions contain at least 10% by weight of an organic solvent for improving the shelf life and the leveling when a coating is formed. Therefore, these water-soluble coating compositions are unsatisfactory in view of air pollution caused by the dissipation of an organic solvent at baking time and resource saving.

Moreover, some of the conventional water-soluble coating compositions can withstand treatment with boiling water. However, when treated with pressurized boiling water having a temperature of 120° C. or higher, coatings formed therefrom have blisters, are dissolved or are whitened. Therefore, the coatings cannot retain an aesthetical value any more.

SUMMARY OF THE INVENTION

It is an object of the present invention to provide a water based coating composition which contains little organic solvent and therefore does not dissipate a large amount of the solvent when baked.

It is another object of the present invention to provide a water based coating composition which has water resistance sufficient to withstand heat treatment of beverage cans and food cans for sterilization, particularly retorting treatment, which has sufficient hardness against scratching in transferring and transportation of cans, and which has processability sufficient to withstand the formation of cans having a variety of forms.

It is further another object of the present invention to provide a water based coating composition excellent in dispersibility for pigment and shelf life.

It is still further another object of the present invention to provide a water based coating composition suitable as a coating composition to coat outer surfaces of cans.

According to the present invention, there is provided a water based coating composition containing, as resin components, 20 to 80 parts by weight of a water based acrylic resin, 20 to 50 parts by weight of a water based amino resin and 5 to 30 parts by weight of an amine-modified epoxy resin.

DETAILED DESCRIPTION OF THE INVENTION

The water based acrylic resin used in the present invention is obtained by copolymerizing an $\alpha, \beta$-monoethylenically unsaturated carboxylic acid monomer selected from acrylic acid and fumaric acid and other monomer selected from acrylic acid alkyl esters such as methyl acrylate and ethyl acrylate, styrene monomers such as styrene and vinyl toluene and hydroxyl group-containing monomers such as hydroxyethyl acrylate and hydroxypropyl acrylate, and neutralizing the resultant copolymer in an alkali component. The amount of the water based acrylic resin based on the resin solid content of the coating composition is 20 to 80 parts by weight, preferably 40 to 60 parts by weight. When this amount is less than the above lower limit, the resultant coating composition shows poor adhesion to an underlying can material, poor dispersibility in water, poor shelf life and poor dispersibility for a pigment. When this amount exceeds the above upper limit, a coating formed from the resultant coating composition has inferior hardness and inferior water resistance.

The water based amino resin used in the present invention refers to an amino resin which is soluble or dispersible in an aqueous medium. The water based amino resin includes a partially alkyl-etherified melamine resin, a partially alkyl-etherified benzoguanamine resin and a spiroguanamine resin obtained by methylolating spiroguanamine alone or a mixture of spiroguanamine with melamine or benzoguanamine and partially alkyl-etherifying the methylolated product with an alcohol having 1 to 3 carbon atoms. The spiroguanamine resin is particularly preferred, since a coating composition containing it generates less tar-like low molecular weight substance than a coating composition containing a melamine resin or benzoguanamine resin when the coating compositions are baked.

The amount of the water based amino resin based on the resin solid content is 20 to 50 parts by weight, preferably 35 to 45 parts by weight. When this amount is less than the above lower limit, a coating formed from the resultant coating composition shows insufficient hardness. When this amount exceeds the above upper limit, the processability of a coating formed from the resultant coating composition deteriorates.

The amine-modified epoxy resin used in the present invention is obtained by adding at least one compound having at least one active hydrogen directly bonded to a nitrogen atom such as ammonia, primary amines and secondary amines to an epoxy compound and/or an epoxy resin.

The epoxy compound is selected from epoxy ester compounds obtained by esterifying part of the epoxy groups of the di- or polyepoxides of an alkylene glycidyl ether resin of which the alkylene group has 1 to 6 carbon atoms, a bisphenol glycidyl ether epoxy resin, a bisphenol methyl glycidyl ether epoxy resin and a novolak epoxy resin with fatty acid, benzoic acid, acrylic acid or methacrylic acid.

The epoxy resin is selected from monoepoxides such as alkyl glycidyl ether of which the alkyl group has 1 to 8 carbon atoms, allyl glycidyl ether, phenyl glycidyl ether, styrene oxide, alkyl phenyl glycidyl ether of which the alkyl group has 1 to 4 carbon atoms and glycidyl versatate, an alkylene glycidyl ether epoxy resin of which the alkylene group has 1 to 6 carbon atoms, a bisphenol glycidyl ether epoxy resin, a bisphenol methyl glycidyl ether epoxy resin and a novolak epoxy resin.

An amine-modified epoxy resin obtained from a bisphenol glycidyl ether epoxy resin and a secondary alkanolamine is particularly preferred, since the resultant coating composition is excellent in shelf life and dispersibility in water over a coating composition containing an amine-modified epoxy resin obtained from other epoxy resin and other amine. The amount of the amine-modified epoxy resin based on the resin solid content is 5 to 30 parts by weight, preferably 5 to 15 parts by weight. When this amount is less than the above lower limit, a coating formed from the resultant coating composition shows poor adhesion, poor water resistance and poor processability. When this amount exceeds the above upper limit, the compatibility of the amine-modified epoxy resin with the other resins deteriorates, and the resultant coating composition shows a high viscosity and poor coatability.

The coating composition of the present invention may contain 0.1 to 2 parts by weight, based on the resin solid content, of a curing aid as required. The curing aid is selected from acid catalysts blocked with an amine such as p-toluenesulfonic acid, dodecylbenzenesulfonic acid and dinonylnaphthalenesulfonic acid which are blocked with an amine.

The coating composition of the present invention may further contain water-soluble resins and water-dispersible resins generally used in a water based coating composition, such as a water-soluble polyester resin, maleated resin and water-soluble poolyol. Further, it may contain a leveling agent, an antifoamer, a lubricant and a pigment.

The water based coating composition of the present invention can be applied to a substrate by any one of known methods such as roll coating, spraying and brushing methods. The substrate includes an electrically plated steel plate, a tin-free steel plate and an aluminum plate.

The water based coating composition of the present invention can be cured under wide baking conditions from baking approximately at 150° to 200° C. for 10 minutes to baking approximately at 250° C. for 10 seconds.

The water based coating composition of the present invention has an excellent shelf life and gives a coating which is excellent in retorting resistance and processability. In particular, the water based coating composition of the present invention gives a coating having toughness and tight adhesion capability to an underlying substrate due to an increase in the polarity caused by a mutual action between a hydrogen atom of the hydroxyl group formed by cleavage of the glycidyl group positioned in the terminal of the amine-modified epoxy resin and an outermost-shell electron of a nitrogen atom bonded to the terminal. Due to the combination of the amine-modified epoxy resin and the water based acrylic resin, the basic component of the amine-modified epoxy resin and the acid component of the water based acrylic resin have an effect that the compatibility of these two resins is enhanced and that hydrogen bonds increase in number. As a result, the water based coating composition of the present invention exhibits excellent dispersibility for a pigment and an excellent shelf life, and gives a coating having excellent processability. Even when the content of an organic solvent in the aqueous medium is smaller than 15%, the water based coating composition of the present invention is stable and excellent in suitability for a coating. Therefore, the water based coating composition of the present invention is useful particularly for forming a coating on the outer surface of beverage and food cans. A coating formed from the water based coating composition of the present invention can withstand retorting treatment of food for sterilization, has sufficiently high hardness against scratching in transferring and transportation and has processability sufficient to withstand the formation of cans having a variety of forms.

The present invention will be further detailed by reference to Examples, in which "part" and "%" stand for "part by weight" and "% by weight".

PREPARATION EXAMPLE 1

Preparation of Water Based Acrylic Resin Solution A1

A four-necked flask having a thermometer, a stirrer, a reflux condenser, a dropping vessel and a nitrogen gas introducing tube was charged with 100 parts of n-butanol. While the mixture was stirred with introducing a nitrogen gas and while the temperature of the mixture was kept at 105° C., a solution prepared by dissolving 5 parts of benzoyl peroxide in 100 parts of a mixture of 30% of styrene, 30% of ethyl acrylate, 10% of butyl acrylate, 10% of 2-hydroxyethyl acrylate, 10% of methyl methacrylate and 10% of acrylic acid was added dropwise from the dropping vessel over 3 hours. Thereafter, the resultant mixture was allowed to react by keeping it at 105° C. for 1 hour. Then, 0.5 part of benzoyl peroxide was added, and the mixture was further allowed to react for 1 hour. And, n-butanol was distilled off under reduced pressure at 80° C. until the nonvolatile content was 83%, and then 14.6 parts of diethanolamine and water were added to give a water based acrylic resin A1 which had a solid content of 50% and a residual butanol content of 10% and which was transparent and viscous.

PREPARATION EXAMPLE 2

A water base acrylic resin A2 was obtained by polymerizing 20% of styrene, 15% of ethyl acrylate, 20% of 2-hydroxyethyl acrylate, 30% of methyl methacrylate and 15% of methacrylic acid in the same manner as in Prepartion Example 1.

PREPARATION EXAMPLE 3

Preparation of Amine-Modified Epoxy Resin Solution

A four-necked flask having a thermometer, a stirrer, a reflux condenser, a dropping vessel and a nitrogen gas introducing tube was charged with 100 parts of bisphenol diglycidyl ether type epoxy resin (Epikote 1001, supplied by Shell Chemical Co.), and 81.4 parts of butyl cellosolve was added. While a nitrogen gas was introduced, the above resin was melted in the butyl cellosolve at 80° C. Then, the temperature in the flask was cooled to 70° C., and 22.1 parts of diethanolamine was added with stirring. The resultant mixture was allowed to react at 70° C. for 2 hours to give an amine-modified epoxy resin B containing 60% of a solid content and 40% of butyl cellosolve.

PREPARATION EXAMPLE 4

Preparation of Phosphoric Acid-Modified Eposy Resin Solution

A four-necked flask having a thermometer, a stirrer, a reflux condenser, a dropping vessel and a nitrogen gas introducing tube was charged with 100 parts of bisphenol diglycidyl ether type epoxy resin (Epikote 1001, supplied by Shell Chemical Co.), and 80.4 parts of butyl cellosolve was added. While a nitrogen gas was introduced, the above resin was melted in the butyl cellosolve at 80° C. Then, the temperature in the flask was increased up to 130° C., and 20.6 parts of orthophosphoric acid was added with stirring. The resultant mixture was allowed to react at 130° C. for 4 hours to give a phosphoric acid-modified epoxy resin C containing 60% of a solid content and 40% of butyl cellosolve.

PREPARATION EXAMPLE 5

Preparation of Epoxy Resin Solution

A four-necked flask having a thermometer, a stirrer, a reflux condenser, a dropping vessel and a nitrogen gas introducing tube was charged with 100 parts of bisphenol diglycidyl ether type epoxy resin (Epikote 1001, supplied by Shell Chemical Co.), and 66.7 parts of butyl cellosolve was added. While a nitrogen gas was introduced, the above resin was melted in the butyl cellosolve to give an epoxy resin D containing 60% of a solid content and 40% of butyl cellosolve.

EXAMPLES 1-3

A1, B and a benzoguanamine resin (Cymel 1123, supplied by Mitsui Cyanamid Ltd.) were mixed in amounts shown in Table 1 (unit: wt. %) (Example 1). A1 and TiO$_2$ were mixed in amounts shown in Table 1 and kneaded, and then resultant mixture was mixed with B and Cymel in amounts shown in Table 1 (Example 2). A2, B and Cymel were mixed in amounts shown in Table 1 (Example 3). Then, butyl cellosolve and water were added to each of the resultant mixtures to prepare coating compositions containing 10% of an organic solvent and 35% of a solid content. Then, 0.3% of p-toluenesulfonic acid amine salt and 0.3% of a silicon-containing leveling agent were added to give water based coating compositions. The so-obtained coating compositions respectively applied to a TFS plate (chromium-treated steel plate) with a natural roll coater and cured by baking them at 190° C. for 10 minutes. The resultant coatings had a thickness of 6 to 8 μm.

COMPARATIVE EXAMPLES 1-3

Coating compositions were prepared from components shown in Table 1 in the same manner as in Examples 1 to 3. However, in Comparative Example 2, A1 and TiO$_2$ were mixed and kneaded in advance. Then, coatings were formed from the so-obtained coating compositions in the same manner as in Examples 1 to 3.

The above prepared coating compositions and the above coatings were tested in the following manner.

1. Shelf life

After a coating composition sample was stored at room temperature for 2 months, a gelation-induced separated state was observed.

2. Physical properties of coating

A coating composition sample was roll-coated on an electrically plated tin plate such that the dried coating had a thickness of 7 μm, and the coating was baked at an ambient temperature of 190° C. in a gas oven for 10 minutes to give a coated panel. For a test on scratching resistance, there was prepared a 3-piece can which was formed of three plates with their surfaces coated with the coating composition outside.

2-1. Test on water resistance

A coated panel was immersed in water having a temperature of 100° C. for 30 minutes, and a whitened state of the coating was observed.

2-2. Test on processability

Erichsen test: A coated panel was extruded according to JIS Z-2247 until a metal plate underlying the coating started to break, and a state of the coating was observed.

2-3. Impact resistance

A du Pont impact tester was used, and while an impacter having a diameter of ½ inch was kept in contact with a sample, a weight of 500 g was dropped on the impacter. A sample was evaluated on its impact resistance on the basis of a height at which no crack occurred.

A: No crack occurred when the weight was dropped from a height of 50 cm.

B: No crack occurred when the weight was dropped from a height of 30 cm.

X: No crack occurred when the weight was dropped from a height of 20 cm.

2-4. Test on pencil hardness

A coating was tested according to the method described in the pencil scratching test (JIS K5400).

2-5. Adhesion test

A coating was subjected to a cross-cut adhesion test.

2-6. Scratch resistance

Coated cans filled with contents were shaken against one another in water at 80° C. That is, per coating sample, 7 cans having a diameter of 65 mm was placed in a basket having a diameter of 205 mm, and the basket was shaken up and down at a distance of 1 cm at 600 times/minute for 5 minutes. Thereafter, the degree of scratching was evaluated.

2-7. Flow

Immediately after a coating sample was applied, the resultant coating was baked in a gas oven, and a leveling state was evaluated.

TABLE 1

|        | Ex. 1 | Ex. 2 | Ex. 3 | CEx. 1 | CEx. 2 | CEx. 3 |
|--------|-------|-------|-------|--------|--------|--------|
| A1     | 40    | 40    |       | 40     | 40     | 40     |
| A2     |       |       | 40    |        |        |        |
| B      | 20    | 20    | 20    |        |        |        |
| C      |       |       |       | 20     | 20     |        |
| D      |       |       |       |        |        | 20     |
| TiO2   |       | 120   |       |        | 120    |        |
| Cymel 1123 | 40 | 40    | 40    | 40     | 40     | 40     |

Ex. = Example.
CEx = Comparative Example

TABLE 2

|                      | Ex. 1 | Ex. 2 | Ex. 3 | CEx. 1 | CEx. 2 | CEx. 3 |
|----------------------|-------|-------|-------|--------|--------|--------|
| Shelf life           | good  | good  | good  | poor   | poor   | poor   |
| Water resistance     | fine  | fine  | fine  | fine   | fine   | blister |
| Retorting resistance | fine  | fine  | fine  |        | whitened |      |
| Processability       | O     | O     | O     | O      | O      | X      |
| Impact resistance    | A     | A     | B     | B      | B      | B      |
| Pencil hardness      | 3H    | 3H    | 4H    | 4H     | 4H     | H      |
| Adhesion             | no peel | no peel | no peel | no peel | no peel | no peel |
| Scratch resistance   | fine  | fine  | fine  | fine   | fine   | scratched |
| Flow                 | good  | good  | good  | good   | good   | poor   |
| Pigment dispersibility | —   | good  | —     | —      | poor   | —      |

Ex. = Example.
CEx. = Comparative Example

What is claimed is:

1. A water-based coating composition containing, as resin components, 20 to 80 parts by weight of a water based acrylic resin, 20 to 50 parts by weight of a water based amino resin and 5 to 30 parts by weight of an amine-modified epoxy resin obtained by adding at least one compound having at least one active hydrogen directly bonded to a nitrogen to an epoxy compound and/or an epoxy resin.

2. A coating composition according to claim 1 wherein the epoxy compound of the amine-modified epoxy resin is a product prepared by partially esterifying the epoxy groups of an epoxy resin having at least 2 epoxy groups.

3. A coating composition according to claim 1, wherein the water based acrylic resin is a product obtained by copolymerizing at least two members selected from the group consisting of an α, β-monoethylenically unsaturated carboxylic acid monomer, acrylic acid alkyl ester, a styrene-containing monomer and a hydroxyl group-containing monomer, and neutralizing an acid component of the resultant copolymer with an alkali component.

4. A coating composition according to claim 1, wherein the water based amino resin is at least one member selected from the group consisting of a partially alkyl-etherified melamine resin, a partially alkyl-etherified benzoguanamine resin, partially alkyl-etherified methylolated spiroguanamine, a partially alkyl-etherified methylolated product of a mixture of spiroguanamine with melamine, and a partially alkyl-etherified methylolated product of a mixture of spiroguanamine with benzoguanamine.

5. A coating composition according to claim 1, wherein the water based acrylic resin is contained in an amount of 40 to 60 parts by weight, the water based amino resin is contained in an amount of 35 to 45 parts by weight, and the amine-modified epoxy resin is contained in an amount of 5 to 15 parts by weight.

* * * * *